United States Patent [19]

Hattori et al.

[11] Patent Number: 5,127,187
[45] Date of Patent: Jul. 7, 1992

[54] SOIL OR SOIL IMPROVER CONTAINING POROUS ION EXCHANGER

[75] Inventors: Michinori Hattori; Kazuo Araragi, both of Tokyo; Teruo Hiramatsu, Osaka, all of Japan

[73] Assignees: NKK Corporation, Tokyo; Yamatogiken K.K., Osaka, both of Japan

[21] Appl. No.: 404,310

[22] Filed: Sep. 7, 1989

[30] Foreign Application Priority Data

Dec. 13, 1988 [JP] Japan .................. 63-313056

[51] Int. Cl.⁵ .................. A01G 31/00; C05F 11/02; C05F 11/04
[52] U.S. Cl. .................. 47/59; 47/66; 71/24; 71/903; 71/904
[58] Field of Search .................. 47/59, 60, 62, 64, 65, 47/66, 40; 71/14, 23, 24, 27, 64.01, 903, 904

[56] References Cited

U.S. PATENT DOCUMENTS

| | | | |
|---|---|---|---|
| 4,402,725 | 9/1983 | Heller et al. | 71/904 X |
| 4,540,427 | 9/1985 | Helbling | 71/904 X |
| 4,927,455 | 5/1990 | Hotta et al. | 71/904 X |

FOREIGN PATENT DOCUMENTS

| | | |
|---|---|---|
| 1118233 | 11/1961 | Fed. Rep. of Germany . |
| 2047820 | 4/1971 | Fed. Rep. of Germany . |
| 2459269 | 6/1976 | Fed. Rep. of Germany . |
| 899936 | 6/1962 | United Kingdom . |

*Primary Examiner*—Ferris Lander
*Attorney, Agent, or Firm*—Sughrue, Mion, Zinn Macpeak & Seas

[57] ABSTRACT

A soil or soil improver for plants which is characterized by combining a charcoal or activated carbon on which oxygen is adsorbed with a soil or soil improver comprising an inorganic or organic ion exchanger and a porous mineral, and a soil or soil improver which further comprises polyacrylamide. By using the soil or soil improver of the invention, plants can continue to grow for four months to one year without supplying water and fertilizer, and various decoration patterns of plants are possible, such as horizontal decoration, reverse decoration and space decoration.

9 Claims, 1 Drawing Sheet

FIG.1
FIG.2
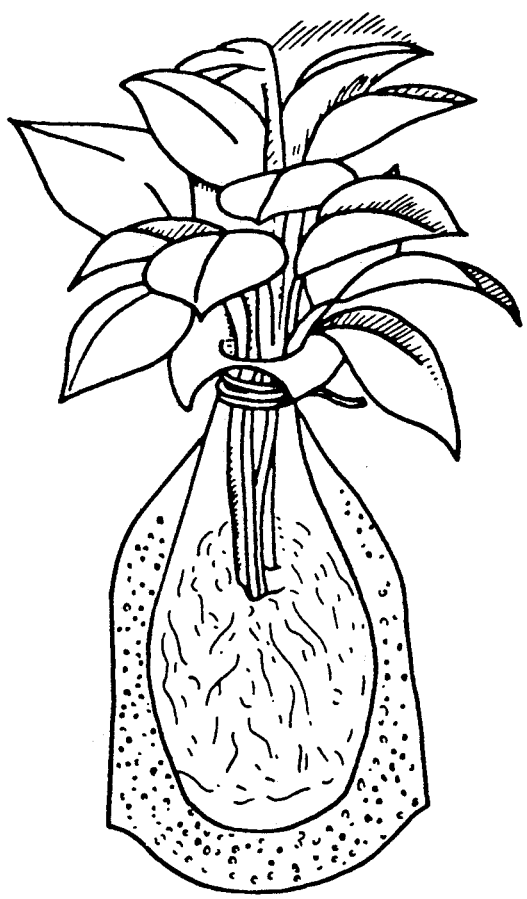

SOIL OR SOIL IMPROVER CONTAINING POROUS ION EXCHANGER

BACKGROUND OF THE INVENTION

1. Field of the Invention

This invention relates to an artificial soil or soil improver suitable for rearing plants, particularly for decorative plants.

2. Description of the Prior Art

Heretofore, various artificial soils have been developed for decorative plants, and porous minerals such as vermiculite and pearlite have been utilized for the artificial soils.

On the other hand, the present inventors developed soils for rearing, plants composed of an inorganic or organic porous ion exchanger blended with at least one kind of porous inorganic materials such as vermiculite, pearlite and zeolite (Japanese Patent KOKAI No. 60-75209) and soil improvers composed of an inorganic or organic porous ion exchanger blended with slag wool (Japanese Patent KOKAI No. 61-91282), for use as soils which save labor for the maintenance of plants such as water supply and fertilization for a long period. In the above soils and soil improvers, water is held by the porous mineral such as vermiculite, pearlite, zeolite or slag wool, and fertilizer components are adsorbed on the ion exchanger. They are gradually released from the porous mineral or the ion exchanger according to their consumption, and supplied to the plants.

The above soils were placed in a water-impermeable bag, one made of a plastic sheet, in a planted state so as to prevent the evaporation of water in the atmosphere.

In general, mycorrhiza fungi live at the roots of plants. The mycorrhiza fungi supply nutrients such as minerals and vitamins to the plants, while the plants supply organic materials to the mycorrhiza fungi as a growth source. Therefore, both are in a symbiosis relationship. In the above soils placed in a water-impermeable bag, since the permeability of oxygen of the plastic sheet is low, the mycorrhiza fungi could not live because of insufficient oxygen.

SUMMARY OF THE INVENTION

An object of the invention is to provide a means to grow mycorrhiza fungi by supplying oxygen stably under circumstances where the evaporation of water is minimized.

Such an object has been achieved by combining charcoal or activated carbon on which oxygen is adsorbed with the aforementioned soil. The above object has more preferably been achieved by further combining therewith polyacrylamide. The present invention has been made based upon the discovery not only that the charcoal and activated carbon having adsorbed oxygen gradually release the oxygen necessary for the growth of mycorrhiza fungi for a long period but also that the charcoal and activated carbon theirselves accelerate the growth of mycorrhiza fungi to release the nutrients necessary for the growth of plants. The inventors have further found that polyacrylamide gradually supplies water to plants for a long period without inhibiting the actions of other components of the soil.

Thus, the present invention provides a soil or soil improver for plants which is characterized by combining charcoal or activated carbon on which oxygen is adsorbed with a soil or soil improver comprising an inorganic or organic porous ion exchanger and a porous mineral, and a soil or soil improver which further comprises polyacrylamide.

BRIEF DESCRIPTION OF THE DRAWINGS

FIGS. 1 and 2 are perspective views showing a state of rearing a plant using the soil of the invention.

DETAILED DESCRIPTION OF THE INVENTION

The inorganic or organic porous ion exchanger adsorbs and holds fertilizer components in the form of a cation and anion, and therefore, both of a cation exchanger and an anion exchanger are necessary. When the porous mineral employed has cation exchange ability, such as vermiculite or slag wool, the ion exchanger may be an anion exchanger alone. The inorganic porous ion exchanger includes a porous mineral, such as vermiculite, zeolite or slag wool, into which ion exchange group(s) are introduced. The organic porous ion exchanger includes various commercial ion exchange resins, such as polystyrene-divinylbenzene resins, acrylic resins, methacrylic resins and ethylenimine resins, into which various ion exchange groups are introduced. Preferable ion exchange resins are more porous. A suitable particle size is about 0.1 to 5 mm in diameter.

Ion exchange groups for the cation exchanger are a carboxyl group, sulfonic acid group, phosphoric acid group, phenol group, thiol group and the like, and the ion exchange group may be a type to form a chelate. Ion exchange groups for the anion exchanger are primary amines, secondary amines, tertiary amines and the like. Preferable ion exchange groups are medium or weakly acidic and basic groups and chelate-forming type groups, because strongly acidic and basic groups release the adsorbed ions with difficulty.

The porous ion exchanger may be irrespective of a combination of an anion exchanger and a cation exchanger or an ampholytic porous ion exchanger. The cation exchange capacity and the anion exchange capacity are preferably almost equal to each other.

Fertilizer components are adsorbed on the porous ion exchanger prior to use. The adsorption may be carried out according to a conventional method. For example, the respective porous ion exchangers are changed to the ion (free) form, and then contacted with an aqueous solution of the fertilizer components. The adsorption is usually carried out prior to blending with other soil components. Since the porous ion exchanger usually has physical adsorption ability in addition to the ion exchange ability, it also adsorbs nonionic and weakly ionic fertilizer components.

The inorganic mineral is vermiculite, pearlite, natural or synthetic zeolite, montmorillonite, kaolin, halloysite, slag wool and the like. Slag wool is obtained by forming in wool shape the slag produced during iron manufacturing processes or steel manufacturing processes as a by-product. Two or more porous minerals may be combined. The porous mineral is used in a water absorption state, usually almost a water saturation state. Such a state can be formed merely by supplying water to the porous mineral. Fertilizer components may be adsorbed on the porous mineral.

The activated carbon may be produced from wood, sawdust, coconut husk, animal bone, lignite, brown coal, peat, coal or the like. It also may be obtained from organic wastes discharged according to respective regions and circumstances by carbonizing and then activating. The charcoal may be produced from any wood. Recently, the waste treatment of bark is becoming a problem, and carbides of the bark are suitable for the invention. The activated carbon and charcoal are preferably granular in view of handling. The adsorption of oxygen on the activated carbon and charcoal may be carried out according to a conventional manner. For example, activated carbon or charcoal is degassed by heating, optionally under reduced pressure, and oxygen gas is blown after cooling. Air may be used as the oxygen gas, and therefore, activated carbon and charcoal prepared according to a conventional process may be utilized for the invention, as it is. The charcoal and activated carbon adsorbing oxygen may be mixed uniformly with the aforementioned soil or soil improver, or disposed around a plant or seed.

The polyacrylamide is used as a water-retentive agent, and it is water-soluble. The form may be powder, fiber or the like. The polyacrylamide may be mixed uniformly with the soil or soil improver, or disposed around the plant or seed in a state mixed with or separated from the charcoal or activated carbon. When the polyacrylamide is disposed separately, it is preferable to dispose the charcoal or activated carbon on the plant side, i.e. to dispose the polyacrylamide on the outside. In view of working efficiency, the gelation of the polyacrylamide by water supply is preferably conducted after mixing it in a dry state with other components. Since the polyacrylamide greatly swells by absorbing water, the soil and soil improver of the invention is placed in a bag, container or the like in due consideration of the swelling volume.

The soil and soil improver of the invention may contain usual soil components such as peat moss.

As to the content of respective components, the inorganic or organic porous ion exchanger is about 2 to 35 vol. %, usually about 10 to 25 vol. %, the porous mineral is about 20 to 70 vol. %, usually about 25 to 40 vol. %, the charcoal and activated carbon are about 5 to 25 vol. %, usually about 5 to 10 vol. %, the polyacrylamide is about 0 to 5 vol. %, usually about 0.5 to 2 vol. %, and the other soil components are about 0 to 50 wt. %. The soil and soil improver of the invention may be blended with synthetic fiber flock in an amount of 0 to 70 volume % to the volume of the soil or soil improver.

When the soil or soil improver of the invention is used, one or more plants is/are set out to the soil, and then the soil is placed in a bag or molded pack. On that occasion, the opening of the bag is shut by binding it with a rope or the like so that the evaporation of water is minimized. The charcoal or activated carbon may be placed in the bag or around the bag. In the latter case, the bag is composed of a gas-permeable sheet such as polypropylene sheet, and the outside of the charcoal or activated carbon portion is covered with an oxygen gas-impermeable plastic sheet bag such as one made of polyvinylidene chloride sheet. The polyacrylamide may also be placed in or around the bag, and in the latter case, the bag is composed of a water (vapor)-permeable sheet, and the outside is covered with a water (vapor)-impermeable plastic sheet bag. When the plant is used for decoration, the bag, molded container or the like may be placed in a pot, such as a flowerpot, a planter or the like.

The soil and soil improver of the invention satisfy three conditions, i.e., an appropriate vapor phase, liquid phase and solid phase in the root portion necessary for the growth of a plant is maintained. That is, the escape of the liquid phase and the solid phase is prevented by closing the soil portion with a bag or the like, and the vapor phase necessary for the growth of mycorrhiza fungi is supplied by combining the charcoal or activated having adsorbed oxygen. In that state, fertilizer components are gradually released from the ion exchanger, and the plant continues to grow. The root acid produced from the root by the growth of the plant is adsorbed and removed by the ion exchanger composing a part of the solid phase. Gases produced by the root are adsorbed on the ion exchanger or the charcoal or activated carbon. With respect to securing the water supply for a long period, the evaporation of water is minimized by closing the soil portion, and a large amount of water is absorbed on the porous mineral having a great water absorbability such as slag wool or vermiculite. Water deterioration problems over a long period are prevented by the ion exchanger. When polyacrylamide is incorporated, it improves a long period water supply by its great water-retentive ability. The polyacrylamide does not inhibit the actions of the soil and soil improver composed of the special components. Moreover, it maintains the planted soil at the conditions suitable for the plant growth by adsorbing and removing acids such as the root acid and an excess amount of cations. As a result of the soil and soil improver of the invention having the above actions, various decoration patterns, such as horizontal decoration, reverse decoration, space docoration and decoration in a bath room, are possible. By using the soil or soil improver of the invention, plants can continue to grow for four months to one year without supplying water and fertilizer.

EXAMPLES

EXAMPLE 1

The following A-material and B-material were prepared, and 70 vol. % of A-material was mixed with 30 vol. % of B-material to obtain a mixed soil.

| A-Material | |
|---|---|
| Peat Moss | 40 vol. % |
| Slag Wool | 7 vol. % |
| Vermiculite | 25 vol. % |
| Vermiculite Anion Exchanger (Yamato Giken) | 23 vol. % |
| Slag Wool Anion Exchanger (Yamato Giken) | 5 vol. % |
| Fertilizer "BM Yo-Rin" *1 (ShinEtsu Chemical) | Small Amount |
| B-Material | |
| "Toraymoss" *2 (Toray) | 90–85 vol. % |
| Slag Wool Anion Exchanger (Yamato Giken) | 10–15 vol. % |

*1 Containing 33 g/100 l of oxygen, 162 g/100 l of an iodide-phosphate compound fertilizer and 10 g/700 ml of delayed fertilizer
*2 Composed of 50 vol. % of a plastic porous body and 50 vol. % of nylon flock The mixed soil was mixed with 6 vol. % of a commercial activated carbon having adsorbed oxygen, and 50 cc/50 g soil of water was added.

Dracaena deremensis Warneckei was set out to the soil, and placed in a polypropylene bag. The opening of the bag was closed by binding with a rope as shown in FIG. 1.

When the plant was put in a bath room without supplying water and fertilizer, it grew for 120 days.

EXAMPLE 2

50 g of the same mixed soil of A-material, B-material and the activated carbon as Example 1 was added to 50 cc of water. Diffenbachia was set out to the soil, and placed in a polypropylene bag. The polypropylene bag was placed in a polyvinylidene chloride bag, and 20–50 g of activated carbon having adsorbed oxygen in a saturated state was placed in the polyvinylidene chloride bag so as to surround the polypropylene bag. The opening of both bags were closed by binding with a rope as shown in FIG. 2, and placed in a pot.

When the plant was put in a tearoom without supplying water and fertilizer, it grew for 120 days.

EXAMPLE 3

A mixed soil was prepared by mixing 50 vol. % of A-material and 50 vol. % of B-material. 10 vol. % of a bark carbonized material having adsorbed oxygen was added to the above mixed soil, and 50 cc/40 g soil of water was added.

Dracaena deremensis Warnechei was set out to the soil, and placed in a polypropylene bag. The opening of the bag was closed by binding with a rope as shown in FIG. 1. When it was hung in a room like a tapestry without supplying water and fertilizer, it grew for 90 days.

EXAMPLE 4

70 vol. % of A-material was mixed with 30 vol. % of B-material, and 6 vol. % of a commercial activated carbon and 0.5 vol. % (dry weight) of polyacrylamide were added to the mixed soil. 50 cc/100 g soil of water was added to the soil.

Dracaena deremensis Warnechei was set out to the soil, and placed in a polypropylene bag. The opening of the bag was closed by binding with a rope as shown in FIG. 1.

When five Dracaena deremensis Warnechei thus planted were put in a bath room without supplying water and fertilizer, they grew for 240 days on average.

On the other hand, except for not adding polyacrylamide, the same soil was prepared, and Dracaena deremensis Warnechei was set out to the soil. The soil was placed in a polypropylene bag, and the opening of the bag was closed by binding with a rope. When five plants thus planted were also put in the same bath room without supplying water and fertilizer, they grew for 120 days on average.

EXAMPLE 5

50 cc of water was added to 100 g of the same mixed soil of A-material and B-material as Example 1, and Diffenbachia was set out. The soil was placed in a polypropylene bag, and the polypropylene bag was placed in a polyvinylidene chloride bag. 6 g of activated carbon having adsorbed oxygen in a saturated state and 2 g (dry weight) of polyacrylamide were placed in the polyvinylidene chloride bag so as to surround the polypropylene bag. After 250 g of water was added to the mixture of activated carbon and polyacrylamide, the opening of both bags were closed by binding with a rope as shown in FIG. 2. The bag was placed in a pot, and put in a tearoom without supplying water and fertilizer, and the plant grew for 200 days.

On the other hand, except for not adding polyacrylamide, when Diffenbachia was cultivated in the same manner as above, it grew for 120 days.

EXAMPLE 6

A mixed soil was prepared by mixing 50 vol. % of A-material and 50 vol. % of B-material. 10 vol. % of a bark carbonized material having adsorbed oxygen and 0.5 vol. % (dry weight) of polyacrylamide were added to the above mixed soil, and 50 cc/50 g soil of water was added.

Dracaena deremensis Warnechei was set out to the soil, and placed in a polypropylene bag. The opening of the bag was closed by binding with a rope as shown in FIG. 1. When it was hung in a room like a tapestry without supplying water and fertilizer, it grew for 150 days.

We claim:

1. A closed water-impermeable bag or container which contains a plant, sufficient water to support the growth of the plant and a soil or soil improver which consists essentially of:
   (a) an inorganic porous material selected from the group consisting of an inorganic porous mineral having cation and anion exchange groups introduced therein when element (b) does not have natural cation exchangeablilty; and
   an inorganic porous mineral having anion exchange groups introduced therein when element (b) has natural cation exchangeability, said inorganic porous material being about 2 to 35 vol. % of the soil or soil improver;
   (b) a porous mineral which differs in exchange capability from element (a), said porous mineral being about 20 to 70 vol. % of the soil or soil improver;
   (c) charcoal or activated carbon which has oxygen adsorbed thereon, said charcoal or activated carbon being about 5 to 25 vol. % of the soil or soil improver; and
   (d) 0 to 50 weight % of peat moss.

2. The soil or soil improver of claim 1 wherein the charcoal or activated carbon is separated from the ion exchanger and the porous mineral through a gas-permeable material.

3. The soil or soil improver of claim 1 wherein the polyacrylamide is separated from the ion exchanger and the porous mineral through a gas-permeable material.

4. The soil or soil improver of claim 1 which further contains polyacrylamide.

5. The soil or soil improver of claim 1 or claim 4 wherein fertilizer components are adsorbed on said ion exchanger.

6. The soil or soil improver of claim 1 or claim 4 wherein said porous mineral is a member selected from the group consisting of vermiculite, pealite, natural zeolite, synthetic zeolite, montmorillonite, kaolin, halloysite and slag wool.

7. The soil or soil improver of claim 1, wherein the quantity of the porous mineral having ion exchange groups introduced thereinto is 10 to 25 vol. %.

8. The soil or soil improver of claim 1, wherein the ion exchange groups are medium or weakly acidic or basic ion exchange groups.

9. The soil or soil improver of claim 1 or claim 4 wherein said ion exchanger is a member selected from the group consisting of ion exchange group-introduced vermiculite, ion exchange group-introduced zeolite and ion exchange group-introduced slag wool.

* * * * *